April 13, 1948.     H. T. AVERY     2,439,555
REVERSIBLE CYCLIC POWER TRANSMISSION MECHANISM
Original Filed Sept. 6, 1938     3 Sheets-Sheet 1

INVENTOR
*HAROLD T. AVERY*
BY
ATTORNEYS

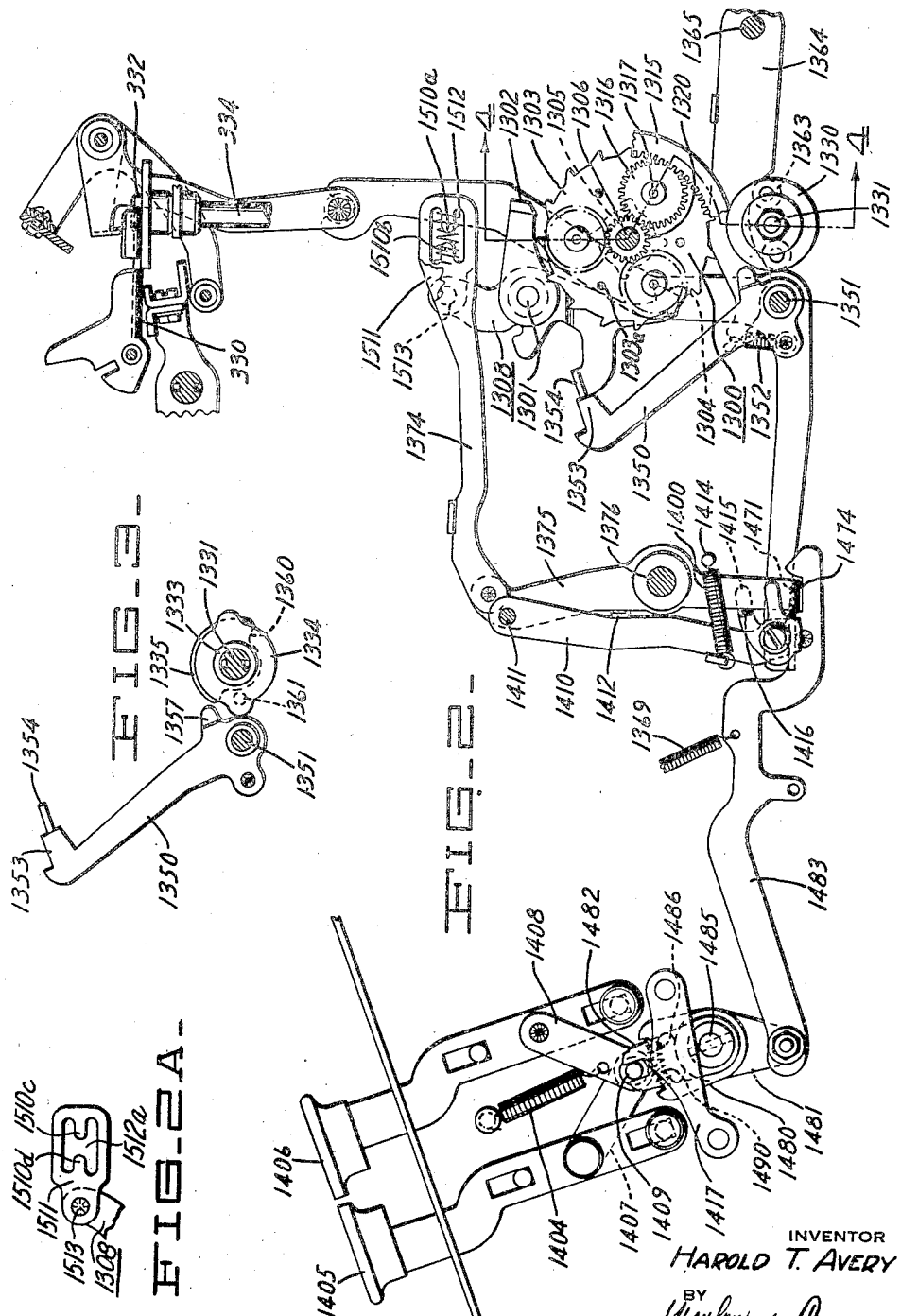

April 13, 1948.    H. T. AVERY    2,439,555
REVERSIBLE CYCLIC POWER TRANSMISSION MECHANISM
Original Filed Sept. 6, 1938    3 Sheets-Sheet 3

INVENTOR
HAROLD T. AVERY
BY
ATTORNEYS

Patented Apr. 13, 1948

2,439,555

UNITED STATES PATENT OFFICE 2,439,555

REVERSIBLE CYCLIC POWER TRANSMISSION MECHANISM

Harold T. Avery, Oakland, Calif., assignor to Marchant Calculating Machine Company, a corporation of California Original application September 6, 1938, Serial No. 228,613. Divided and this application September 18, 1944, Serial No. 554,557

14 Claims. (Cl. 192—3.6)

The present invention relates to calculating machines and the like having cyclically and reversibly operable devices driven through a cyclic power transmission mechanism and has particular reference to means for controlling planetary gearing or the like to cause it to operate cyclically in either a forward or reverse diection.

Planetary gearing and similar gearing arrangements operating on the same principles are susceptible of employment both as forward driving mechanisms and as reversing mechanisms, and constitute exceedingly compact arrangements for performing these multiple functions. However, in environments in which the gearing employed must be cyclic in its action to arrest the driven element always at the same rotational position, it has heretofore been necessary when using planetary gearing mechanism to provide for extracyclic movement of the driven element in order to disconnect, and then to return the driven element backward to its full cycle position.

The principal object of the present invention is to make possible the employment of such an inherently non-cyclic gearing arrangement as a connecting means or as both a forward driving and reversing means in any environment in which cyclically operating reversible power transmission mechanism is to be employed, without requiring extracyclic movement of the driven mechanism for controlling or adjusting the forward driving and reversing means.

As an illustration of one application of the invention, a power transmission embodying the same is disclosed in connection with a carriage shifting mechanism for a "Marchant" calculating machine of the type disclosed in the Avery patent application Serial Number 702,949, filed December 18, 1933, and since matured into Patent Number 2,211,736, issued on August 13, 1940, to which reference may be had for a disclosure of a complete "Marchant" calculating machine, including mechanism not specifically disclosed herein. The present application is a division of the copending Avery application Serial Number 228,613, filed September 6, 1938, now Patent No. 2,376,954, granted May 29, 1945, the latter disclosing and claiming certain automatic shift arresting mechanism illustrated in the accompanying drawings, which application, now Patent No. 2,376,954, is in turn, a continuation of the application on which the aforementioned Patent No. 2,211,736 was issued.

In a machine of the general type disclosed in the aforesaid Avery Patent Number 2,211,736, a power transmission mechanism is provided whereby the shiftable carriage may be moved laterally by power derived from the motor. This motor may operate continuously, but preferably is controlled by an electric switch, automatically closed upon operation of the carriage shift controls, as also disclosed in detail in the aforesaid Avery Patent Number 2,211,736. Carriage shifting is effected by such power transmission mechanism controlled by a key, or preferably, two keys whereby the mechanism may be rendered effective to cause the carriage to be shifted in one, or selectively, in the other direction.

When a carriage shift control key is depressed by the operator of such a machine, and carriage is moved in the selected direction, into the desired operating position. The power transmission functioning in this operation should operate cyclically so that, even though the shift control key is released after the power transmission has commenced but before it has completed a cycle, the carriage will be power driven into the next operating position.

The manner in which the above and other objects of the invention are accomplished will be readily understood on reference to the following specification when read in conjunction with the accompanying drawings wherein:

Figure 2 is a side view illustrating the carriage shifting power transmission mechanism and controls therefor;

Fig. 2A is a detail view showing a portion of Fig. 2;

Figure 3 is a detail sectional view showing the mechanism which effects cyclic disengagement of the power transmission mechanism.

Shift actuating mechanism

The machine is provided with a motor (not shown) which constitutes the driving means for the carriage shift power transmission mechanism 1300 (Figure 2). The power is transmitted from the motor through suitable gears and shafts to gear 362 (Figure 4) to drive this power transmission mechanism. Said gear is rotatably mounted on shaft 1306 which is positioned between the center and right side frames 500 and 501, respectively, of the machine. Gear 648, which is used to drive unrelated mechanisms (not shown), is also rotatably mounted on shaft 1306 by a flanged sleeve 1307, which is keyed to the hub of gear 362 and secured by rivets to gear 648, the same rivets affixing a dished ring gear supporting disc 1309 to the said gear 648.

Figure 4:
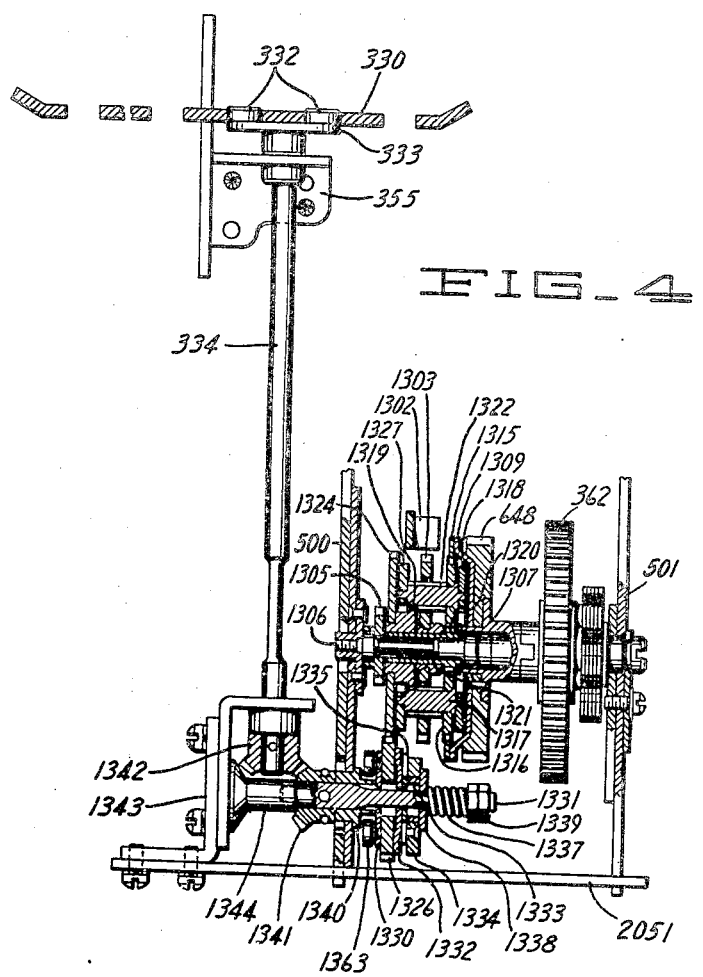
Fig. 4 is a sectional view through the power transmission mechanism, illustrating its connection to the carriage, and is taken along the line 4—4 of Figure 2.

The power transmission mechanism, as shown in Figures 2 and 4, comprises an internal ring gear 1315 secured to the supporting disc 1309 and enmeshed with three planetary gears 1316 riveted to each of three shafts 1317, respectively, which extend through clearance holes provided in a ratchet wheel 1303, and have end bearings in plates 1318 and 1319. These plates and the ratchet wheel are secured together as a rigid unit by three studs 1303a. The gears 1316 also mesh with a sun gear 1320 formed upon one end of a sleeve 1321 to the opposite end of which a second ratchet wheel 1305 is keyed. Sleeve 1321 and wheel 1305 are journaled on the shaft 1306.

Gear teeth 1322 formed on the shafts 1317 mesh with a second sun gear 1327 journaled on sleeve 1321. Secured to gear 1327 is a gear 1324 by which power is transmitted from this mechanism to a cyclically operated shift drive train.

This power transmission mechanism may be selectively controlled so as to drive the shift drive train in either direction by means comprising a selectively settable control member 1308. Gear 362 is always rotated in the same direction when the motor is running, driving gear 648 and ring gear 1315 so that planetary gears 1316, and their associated gears 1322 will normally revolve idly about sun gear 1327. If the ratchet wheel 1303 is held, however, as when dog 1302 (Figure 2) of control member 1308 is rocked into holding engagement therewith, revolution of the planetary gears 1316, 1322 about sun gears 1320 and 1327 is prevented and said planetary gears function as idlers to transmit the drive to the sun gear 1327, and its associated gear 1324. If, however, the other ratchet wheel 1305 is held by dog 1304 (Figure 2) of control member 1308, being rocked into holding engagement therewith, sun gear 1320 will be held stationary and the planetary gears 1316—1322 will all rotate about their own centers and also revolve about sun gear 1320, thereby driving the gear 1324 in the opposite direction. This selective reversal of rotation of gear 1324 is utilized to drive the carriage shift train selectively in one or the other direction.

Power is transmitted from gear 1324 to this drive train by means comprising a gear 1326 meshing with gear 1324, gear 1326 being rotatably mounted on the shaft 1331 (Figure 4) between friction discs 1330 and 1332 keyed to said shaft. A sleeve 1333 is also mounted on shaft 1331, and a spring 1337 is compressed between a washer 1338, located in juxtaposition with the sleeve 1333, and lock nuts 1339 on the threaded end of shaft 1331. This construction provides for a frictional drive connection between gear 1326 and shaft 1331 effected by the keyed discs 1330 and 1332, which are pressed against the gear 1326 by spring 1337 bearing against the washer 1338, the sleeve 1333, and an interposed disc 1335, the purpose of which will be explained hereinafter.

The shaft 1331 is supported in a suitable bearing 1340 securely mounted in a frame of the machine, and a sleeve bearing 1344 riveted to an angle bracket 1343. A bevel gear 1341 is fixed on the end of the shaft 1331 and meshes with a bevel gear 1342 securely mounted on the lower end of vertical shaft 334, also supported in the angle bracket 1343 secured to the base plate 2051 of the machine.

Figure 1:
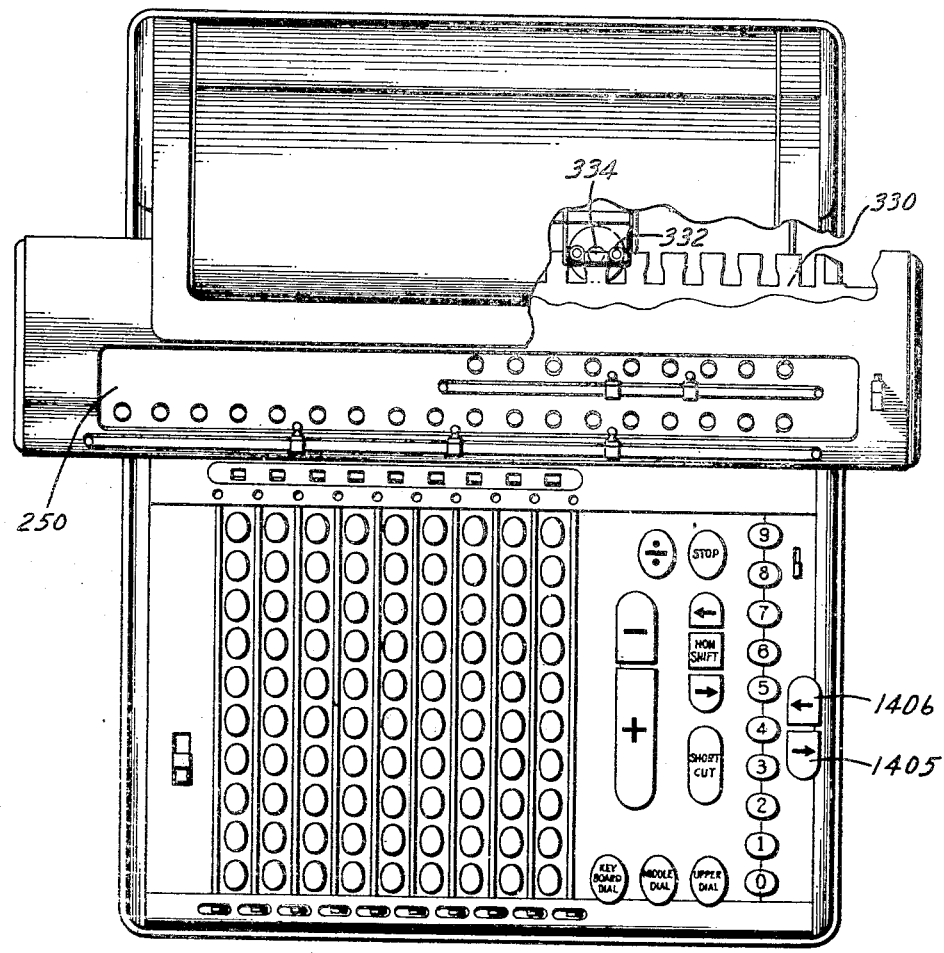
Figure 1 is a plan view of a "Marchant" calculating machine embodying the present invention.

The aforesaid shaft 334 is supported at its upper end by bracket 355 secured to the back frame plate of the machine. The upper end of shaft 334 also has fixed thereto a hub and plate assembly 333 on which are mounted two diametrically disposed rollers 332 adapted to engage between the teeth of rack 330, mounted on the shiftable carriage 250 (see also Figure 1) and thereby, upon rotation of the shaft 334 by the power transmission mechanism serves to drive the carriage laterally to the right or to the left, selectively.

It should be noted that the several teeth of the rack 330 are spaced apart from each other a distance equal to the spacing between each of the different carriage positions. Thus, each half rotation of the shafts 334 and 1331 will shift the carriage from one position to the next, and will constitute one cycle of operation of the shift mechanism.

Shift control mechanism

The controls for causing the power transmission mechanism to effect a driving connection between the carriage shift train and the motor are operable by the keys 1405 and 1406 (Figures 1 and 2), and means are provided whereby the depression of one or the other of said keys will effect the engagement of the dog 1302 or 1304 of control member 1308 with one of the ratchets 1303 or 1305, respectively, thereby both initiating and determining the direction of the carriage shift.

The keys 1405 and 1406 comprise vertically sliding stems, which are connected by means of links 1407 and 1408 (Figure 2) with a common pin 1409 pivotally attached thereto, while a spring 1404, tensioned between one of said links and a stud on the machine frame, normally urges both of the keys 1405 and 1406 upwardly. Upon depression of the key 1405, the pin 1409 is moved to the right, and upon depression of the key 1406 the pin 1409 is moved to the left, as viewed in Figure 2. A stationary member 1417 guides the pin 1409 in either its right or left hand movement and also serves as an interlock so that neither one of the keys 1405 or 1406 can be depressed when the other one is in a depressed position.

Either right or left hand movement of the pin 1409 will be transmitted through bifurcated arm 1482 to rock the shaft 1485, to which arm 1482 is pinned, clockwise or counter-clockwise, depending upon which of the keys is depressed. Disposed on the shaft 1485, adjacent to each other, are two similar V-shaped members 1480 and 1481, each of which is provided with two facing lugs 1486. A spring 1490 is compressed between these four lugs so that a rocking movement in either direction can be transmitted from one of the V-shaped members to the other through the spring 1490. Member 1480 is pinned to the shaft 1485 and is rocked by the movement of arm 1482, thus rocking the member 1481 which is free on the shaft 1485, and which has a downwardly extending arm pivotally connected to the link 1483 which is thus moved to the right (as viewed in Figure 2) when key 1406 is depressed or to the left when key 1405 is depressed. If, for any reason, movement of link 1483 is prevented at any time, depression of either key will merely compress spring 1490 without moving the member 1481, but under normal conditions the movement described will be effected. This results in the rocking, about its pivot 1376, of a lever 1375 which is provided with a lateral projection 1471, normally engaging in a notch 1474 in the rearward end of link 1483 held in engagement with said projection by spring 1369 tensioned between link 1483 and the machine frame.

The rocking of lever 1375 imparts longitudinal movement to a link 1374 pivoted to the upper end thereof and provided at its rear end with an aperture 1512 in which are two facing lugs 1510a and 1510b. Juxtaposed the rear end of link 1374 is a link 1511 (Fig. 2A) with an identical aperture, 1512a, also with two facing lugs 1510c and 1510d. Link 1374 and link 1511 are yieldingly connected by compression spring 1512 located over the four lugs, and link 1511 is pivotally connected at its forward end to the control member 1308 by a stud 1513, so that longitudinal movement of link 1374 will cause rocking movement of the control member 1308 about the fixed support shaft 1301. The control member 1308 has a rearwardly extending arm provided with a dog 1302 adapted to engage ratchet wheel 1303, and a downwardly extending arm provided with a dog 1304 adapted to engage the ratchet wheel 1305.

Thus, upon depression of key 1406 to initiate a carriage shift to the left, the link 1483 is moved to the right, as viewed in Figure 2, imparting counter-clockwise movement to the lever 1375, leftward movement to link 1374, and counter-clockwise movement to the control dog 1308, moving dog 1304 into holding engagement with the ratchet wheel 1305 to cause transmission of the drive to the carriage, as has been previously described.

When a right hand carriage shift is desired, the key 1405 is depressed, thus moving the link 1483 to the left to rock lever 1375 in a clockwise direction. This rocking movement of lever 1375 moves the link 1374 to the right causing the dog 1302 to engage the ratchet 1303, thus reversing the direction of rotation of the carriage shifting mechanism.

According to the present invention means are provided whereby either of the dogs 1302 or 1304 is held in engagement with its respective ratchet wheel during approximately the first three-quarters of the shift cycle, to prevent interruption of the driving connection during any initiated shift cycle, no matter how quickly the respective shift key is released. On a leftward extension of the control member 1308 (Figure 2) is a formed ear 1354 (see also Figure 3), adapted to engage a projection 1353 of a latch 1350, pivotally mounted at 1351 and urged into engagement with said ear by a spring 1352 which is tensioned between the latch and a centralizer 1364. When control member 1308 is moved either clockwise or counter-clockwise, the ear 1354 is released from against the face of lug 1353 on latch 1350 and the latch then rocks about shaft 1351 under the tension of spring 1352 and seats its projection 1353 either above or below ear 1354, thus latching the control member 1308 against return movement.

Provision is made whereby additional tension is put on spring 1352 at the beginning of the cycle of operation of the power transmission mechanism so as to insure seating of the projection 1353 under or over the ear 1354. For this purpose, the centralizer 1364, which is pivoted on a frame pin 1365, has the upper end of spring 1352 attached to the extreme left end thereof. When the shaft 1331 first begins to rotate, rollers 1363 which are mounted on the disc 1330 revolve, and in their movement cam the centralizer 1364 upwardly, thereby exerting more and more tension on the spring 1352 until the shaft 1331 has made one-quarter of a rotation.

Provision is made for releasing the ear 1354 from latch 1350 at a predetermined point in the cycle regardless of in which direction the carriage shift drive train is rotating. For this purpose a cam 1334 mounted on the sleeve 1333 includes two opposite rises over which a nose 1357 of the latch 1350 rides, the two rises being required because, as previously explained, one-half rotation of shaft 1331 is a full cycle of operation of the shift mechanism. The cam 1334 is free on the sleeve 1333 and is driven by a lost motion connection with shaft 1331 comprising the disc 1335 which is keyed to shaft 1331 and provided with two shoulders 1360 on opposite sides thereof. Upon clockwise rotation of the disc 1335 from the position shown in Figure 3, a pin 1361 on the cam 1334 is engaged by the rightmost shoulder 1360 and the nose 1357 is cammed upwardly during the latter part of the cycle. Upon counter-clockwise rotation of the disc 1335 from the position shown in Figure 3, the leftmost shoulder 1360 engages the stud 1361 of cam 1334 and drives the latter in a counterclockwise direction. During the latter part of the cycle, the rise of cam 1334 opposite the stud 1361 engages the nose 1357 and cams the latch 1350 counter-clockwise to releasing position.

When the latch 1350 is thus released, the control member 1308 is automatically centralized to remove the effective dog 1302 or 1304 from engagement with its ratchet wheel. For this purpose a lever 1410 which is pivotally mounted in the machine frame at 1411 is provided with a lug 1412 extending laterally into engagement with lever 1375 above the pivot 1376, and an adjustable lug 1415 having an offset 1416 engaging the lever 1375 below said pivot, and pressed against the lever 1375 by a spring 1400 tensioned between the free end of lever 1410 and a pin 1414 on the machine frame. Thus the centralizer 1410 tends to maintain the lever 1375 in a central position in which the control member 1308 will be ineffective, and will return it to said central position automatically upon release of latch 1350, provided the operating keys 1405 and 1406 or other shift controlling means (not shown) are released.

Although the drive to the carriage through the power transmission mechanism is thus terminated at approximately three-quarter cycle position, the shift drive train will be rotated through the remainder of its cycle, consisting of one-quarter of a revolution of shaft 1331, by the centralizer 1364, pressed by spring 1352 against rollers 1363 on disc 1330 secured to said shaft.

It will be noted that the load imposed upon the carriage shifting mechanism by the frictional resistance set up in shifting the carriage and in rotating the shafts 334 and 1331 etc., is also applied through the planetary gearing to whichever ratchet wheel 1303 and 1305 is engaged by its respective one of the dogs 1302, 1304, the ratchet wheel exerting this force against its respective dog. This load may be of such a magnitude as to tend to prevent a spring such as 1400 from returning the member 1308 to its illustrated neutral position after the carriage is shifted to a desired operating position. The centralizer 1364 acts to remove part of this load upon the engaged ratchet wheel during the latter part of each shift cycle by aiding the transmission mechanism in driving the carriage ahead during this period. Therefore, any tendency of the engaged ratchet wheel to hold the member 1308 from being returned is reduced during the latter part of the cycle to a sufficient extent to permit spring 1400 to effectively return it and thus interrupt the driving connection between the carriage shift drive train and the motor.

Although the invention has been illustrated as embodied in a calculating machine, and particularly in the carriage shifting mechanism thereof, it will be understood that the invention is not restricted to such particular uses, but is generally applicable to any kind of machine in which a cyclically operating power transmission mechanism is to be employed.

What I claim is:

1. In a cyclically operable power transmission for releasably connecting a rotatable driving element with a cyclically operable rotatable driven element; the combination with means for selectively effecting a driving connection between said driving and driven elements comprising a control member selectively adjustable to an active position to cause said driving element to rotate said driven element, and to an inactive position to permit rotation of said driving element without transmission of driving movement to said driven element; of means for latching said control member in active position, a device responsive to movement of said member to active position and operable independently of said driven element for controlling movement of said latching means to latching position, means operating in timed relationship with said driven element for releasing said control member from said latching means at a point in each cycle of operation of said driven element which is antecedent to the arrival of said driven element at its full cycle position, and means for returning said control member to said inactive position upon release thereof from said latching means.

2. In a cyclically operable power transmission for releasably connecting a rotatable driving element with a cyclically operable rotatable driven element; the combination with means for selectively effecting a driving connection between said driving and driven elements comprising a control member selectively adjustable to an active position to cause said driving element to rotate said driven element, and to an inactive position to permit rotation of said driving element without transmission of driving movement to said driven element; of means for latching said control member in active position upon movement of said member thereto comprising a rockable latch member and means actuated by said driven element for rocking said latch member into latching relationship with respect to said control member, means operating in timed relationship with said driven element for releasing said control member from said latching means at a point in each cycle of operation of said driven element which is antecedent to the arrival of said driven element at its full cycle position, and means for returning said control member to said inactive position upon release thereof from said latching means.

3. In a cyclically operable power transmission for releasably connecting a rotatable driving element with a cyclically operable rotatable driven element; the combination with means for selectively effecting a driving connection between said driving and driven elements comprising a control member selectively adjustable to an active position to cause said driving element to rotate said driven element, and to an inactive position to permit rotation of said driving element without transmission of driving movement to said driven element; of means for latching said control member in active position upon movement of said member thereto comprising a rockable latch member and means actuated by said driven element and including a normally tensioned spring for rocking said latch member into latching relationship with respect to said control member, means operating in timed relationship with said driven element for releasing said control member from said latching means at a point in each cycle of operation of said driven element which is antecedent to the arrival of said driven element at its full cycle position, and means for returning said control member to said inactive position upon release thereof from said latching means.

4. In a cyclically operable power transmission for releasably connecting a rotatable driving element with a cyclically operable rotatable driven element; the combination with means for selectively effecting a driving connection between said driving and driven elements comprising a control member selectively adjustable to an active position to cause said driving element to rotate said driven element, and to an inactive position to permit rotation of said driving element without transmission of driving movement to said driven element; of means for latching said control member in active position, a device responsive to movement of said member to active position and operable independently of said driven element for controlling movement of said latching means to latching position, means operating in timed relationship with said driven element for releasing said control member from said latching means at a point in each cycle of operation of said driven element which is antecedent to the arrival of said driven element at its full cycle position, means for returning said control member to said inactive position upon release thereof from said latching means, and means for advancing said driven element to full cycle position and bringing it to rest therein upon cessation of the transmission of driving movement from said driving element to said driven element.

5. In a cyclically operable, reversible power transmission for releasably connecting a rotatable driving element with a cyclically operable rotatable driven element; the combination with means for selectively effecting a driving connection between said driving and driven elements comprising a control member selectively adjustable to a first active position to cause said driving element to rotate said driven element in one direction; to a second active position to cause said driving element to rotate said driven element in the opposite direction; and to a third inactive position to permit rotation of said driving element without transmission of driving movement to said driven member; of means for latching said control member in the one or the other active position upon movement of said member to either of said positions, means operating in timed relationship with said driven element for releasing said control member from said latching means at a point in each cycle of operation of said driven element which is substantially the same during rotation of said driven element in either direction and which is antecedent to the arrival of said driven element at its full cycle position, means for returning said control member to said inactive position upon release thereof from said latching means, and means for advancing said driven element to full cycle position and bringing it to rest therein upon cessation of the transmission of driving movement from said driving element to said driven element.

6. In a cyclically operable, reversible power transmission for releasably connecting a rotatable driving element with a cyclically operable rotatable driven element; the combination with means for selectively effecting a driving connection between said driving and driven elements comprising a control member selectively adjustable to a first active position to cause said driving element to rotate said driven element in one direction; to a second active position to cause said driving element to rotate said driven element in the opposite direction; and to a third inactive position to permit rotation of said driving element without transmission of driving movement to said driven member; of means for latching said control member in the one or the other active position upon movement of said member to either of said positions, means operating in timed relationship with said driven element for releasing said control member from said latching means at a point in each cycle of operation of said driven element which is substantially the same during rotation of said driven element in either direction and which is antecedent to the arrival of said driven element at its full cycle position; said releasing means comprising a latch releasing cam and a lost-motion actuator for said cam driven by said driven element, means for returning said control member to said inactive position upon release thereof from said latching means, and means for advancing said driven element to full cycle position and bringing it to rest therein upon cessation of the transmission of driving movement from said driving element to said driven element.

7. In a cyclically operable, reversible power transmission for releasably connecting a rotatable driving element with a cyclically operable rotatable driven element; the combination with means for selectively effecting a driving connection between said driving and driven elements comprising a control member selectively adjustable to a first active position to cause said driving element to rotate said driven element in one direction; to a second active position to cause said driving element to rotate said driven element in the opposite direction; and to a third inactive position to permit rotation of said driving element without transmission of driving movement to said driven member; of means for latching said control member in the one or the other active position upon movement of said member to either of said positions comprising a rockable latch member and means actuated by said driven element for rocking said latch member into latching relationship with respect to said control member, means operating in timed relationship with said driven element for releasing said control member from said latching means at a point in each cycle of operation of said driven element which is substantially the same during rotation of said driven element in either direction and which is antecedent to the arrival of said driven element at its full cycle position, means for returning said control member to said inactive position upon release thereof from said latching means, and means for advancing said driven element to full cycle position and bringing it to rest therein upon cessation of the transmission of driving movement from said driving element to said driven element.

8. In a cyclically operable, reversible power transmission for releasably connecting a rotatable driving element with a cyclically operable rotatable driven element; the combination with means for selectively effecting a driving connection between said driving and driven elements comprising a control member selectively adjustable to a first active position to cause said driving element to rotate said driven element in one direction; to a second active position to cause said driving element to rotate said driven element in the opposite direction; and to a third inactive position to permit rotation of said driving element without transmission of driving movement to said driven member; of means for latching said control member in the one or the other active position upon movement of said member to either of said positions comprising a rockable latch member and means actuated by said driven element for rocking said latch member into latching relationship with respect to said control member, means operating in timed relationship with said driven element for releasing said control member from said latching means at a point in each cycle of operation of said driven element which is substantially the same during rotation of said driven element in either direction and which is antecedent to the arrival of said driven element at its full cycle position; said releasing means comprising a latch releasing cam and a lost-motion actuator for said cam driven by said driven element, means for returning said control member to said inactive position upon release thereof from said latching means, and means for advancing said driven element to full cycle position and bringing it to rest therein upon cessation of the transmission of driving movement from said driving element to said driven element.

9. In a cyclically operable, reversible power transmission for releasably connecting a rotatable driving element with a cyclically operable rotatable driven element; the combination with means for selectively effecting a driving connection between said driving and driven elements comprising a control member selectively adjustable to a first active position to cause said driving element to rotate said driven element in one direction; to a second active position to cause said driving element to rotate said driven element in the opposite direction; and to a third inactive position to permit rotation of said driving element without transmission of driving movement to said driven member; of means for latching said control member in the one or the other active position upon movement of said member to either of said positions comprising a rockable latch member and means actuated by said driven element and including a normally tensioned spring for rocking said latch member into latching relationship with respect to said control member; means operating in timed relationship with said driven element for releasing said control member from said latching means at a point in each cycle of operation of said driven element which is substantially the same during rotation of said driven element in either direction and which is antecedent to the arrival of said driven element at its full cycle position, means for returning said control member to said inactive position upon release thereof from said latching means, and means for advancing said driven element to full cycle position and bringing it to rest therein upon cessation of the transmission of driving movement from said driving element to said driven element.

10. In a cyclically operable, reversible power transmission for releasably connecting a rotatable driving element with a cyclically operable rotatable driven element; the combination with means for selectively effecting a driving connection between said driving and driven elements comprising a control member selectively adjustable to a first active position to cause said driving element to rotate said driven element in one direction; to a second active position to cause said driving element to rotate said driven element in the opposite direction; and to a third inactive position to permit rotation of said driving element without transmission of driving movement to said driven member; of means for latching said control member in the one or the other active position upon movement of said member to either of said positions comprising a rockable latch member and means actuated by said driven element and including a normally tensioned spring for rocking said latch member into latching relationship with respect to said control member, means operating in timed relationship with said driven element for releasing said control member from said latching means at a point in each cycle of operation of said driven element which is substantially the same during rotation of said driven element in either direction and which is antecedent to the arrival of said driven element at its full cycle position; said releasing means comprising a latch releasing cam and a lost-motion actuator for said cam driven by said driven element, means for returning said control member to said inactive position upon release thereof from said latching means, and means for advancing said driven element to full cycle position and bringing it to rest therein upon cessation of the transmission of driving movement from said driving element to said driven element.

11. In a cyclically operable power transmission for releasably connecting a rotatable driving element with a cyclically operable rotatable driven element; the combination with means for selectively effecting a driving connection between said driving and driven elements comprising a device rotatable by said driving element and a control member selectively adjustable to an active position to restrain said device against rotation by said driving element and thus cause said driving element to rotate said driven element, and to an inactive position to permit rotation of said device by said driving element without transmission of driving movement to said driven element; the action of said driving element upon said device when said device is restrained by said control member tending to retain said control member in said active position; of means for latching said control member in active position upon movement of said member thereto, means operating in timed relationship with said driven element for releasing said control member from said latching means at a point in each cycle of operation of said driven element which is antecedent to the arrival of said driven element at its full cycle position, spring means tending to return said control member to said inactive position upon release thereof from said latching means, and means for advancing said driven element to full cycle position and effective to minify the aforesaid action of said driving element upon said device to a sufficient extent to permit said spring means to return said control member to said inactive position; said advancing means being also effective to bring said driven element to rest in full cycle position upon cessation of the transmission of driving movement from said driving element to said driven element.

12. In a cyclically operable power transmission for releasably connecting a rotatable driving element with a cyclically operable rotatable driven element; the combination with means for selectively effecting a driving connection between said driving and driven elements comprising two devices rotatable by said driving element and a control member selectively adjustable to a first active position to restrain one of said devices against rotation by said driving element and thus cause said driving element to rotate said driven element in one direction; to a second active position to restrain the other of said devices against rotation by said driving element and thus cause said driving element to rotate said driven element in the opposite direction; and to a third inactive to permit rotation of both of said devices by said driving element without transmission of driving movement to said driven element; the action of said driving element upon said devices when either of said devices is restrained by said control member tending to retain said control member in its instant active position; of means for latching said control member in the one or the other active position upon movement of said member to either of said positions, means operating in timed relationship with said driven element for releasing said control member from said latching means at a point in each cycle of operation of said driven element which is substantially the same during rotation of said driven element in either direction and which is antecedent to the arrival of said driven element at its full cycle position, spring means tending to return said control member to said inactive position upon release thereof from said latching means, and means for advancing said driven element to full cycle position and effective to minify the aforesaid action of said driving element upon said device to a sufficient extent to permit said spring means to return said control member to said inactive position; said advancing means being also effective to bring said driven element to rest in full cycle position upon cessation of the transmission of driving movement from said driving element to said driven element.

13. In a cyclically operable power transmission for releasably connecting a rotatable driving element with a cyclically operable rotatable driven element; the combination with means for selectively effecting a driving connection between said driving and driven elements comprising two devices rotatable by said driving element and a control member selectively adjustable to a first active position to restrain one of said devices against rotation by said driving element and thus cause said driving element to rotate said driven element in one direction; to a second active position to restrain the other of said devices against rotation by said driving element and thus cause said driving element to rotate said driven element in the opposite direction; and to a third inactive to permit rotation of both of said devices by said driving element without transmission of driving movement to said driven element; the action of said driving element upon said devices when either of said devices is restrained by said control member tending to retain said control member in its instant active position; of means for latching said control member in the one or the other active position upon movement of said member to either of said positions, means operating in timed relationship with said driven element for releasing said control member from said latching means at a point in each cycle of operation of said driven element which is substantially the same during rotation of said driven element in either direction and which is antecedent to the arrival of said driven element at its full cycle position; said releasing means comprising a latch releasing cam and a lost-motion actuator for said cam driven by said driven element, spring means tending to return said control member to said inactive position upon release thereof from said latching means, and means for advancing said driven element to full cycle position and effective to minify the aforesaid action of said driving element upon said device to a sufficient extent to permit said spring means to return said control member to said inactive position; said advancing means being also effective to bring said driven element to rest in full cycle position upon cessation of the transmission of driving movement from said driving element to said driven element.

14. In a calculating machine having a motor and devices cyclically and reversibly operable thereby; the combination with a forward driving and reversing power transmission mechanism for connecting said motor to said devices and controls selectively settable to cause said mechanism to effect a driving connection between said motor and said devices and transmit continuous rotational movement in either direction to said devices, or to interrupt said driving connection; of means for preventing interruption of said driving connection except at a predetermined cyclic position of said devices, comprising means for retaining said controls in set positions, and means actuated by said devices and including a lost-motion connection between said devices and said retaining means, for releasing said controls from said retaining means when said devices reach substantially the same cyclic position during rotation in either direction.

HAROLD T. AVERY.

REFERENCES CITED

The following references are of record in the file of this patent:

UNITED STATES PATENTS

| Number | Name | Date |
|---|---|---|
| 1,646,465 | Thompson | Oct. 25, 1927 |
| 2,065,820 | Mellon | Dec. 29, 1936 |
| 2,162,238 | Avery | June 13, 1939 |